(12) United States Patent
Smith et al.

(10) Patent No.: US 12,234,770 B2
(45) Date of Patent: Feb. 25, 2025

(54) GAS TURBINE ENGINE WITH HYDROGEN FUEL SYSTEM

(71) Applicant: Pratt & Whitney Canada Corp., Longueuil (CA)

(72) Inventors: Scott Smith, St-Lambert (CA); Russell Stratton, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/211,083

(22) Filed: Jun. 16, 2023

(65) Prior Publication Data

US 2024/0418124 A1 Dec. 19, 2024

(51) Int. Cl.
  *F02C 7/14* (2006.01)
  *F02C 3/22* (2006.01)
  *F02C 7/22* (2006.01)

(52) U.S. Cl.
  CPC .............. *F02C 7/14* (2013.01); *F02C 3/22* (2013.01); *F02C 7/22* (2013.01); *F05D 2220/323* (2013.01); *F05D 2260/213* (2013.01)

(58) Field of Classification Search
  CPC ......... F05D 2220/323; F05D 2260/211; F05D 2220/72; F05D 2220/32; F05D 2220/60; F02C 7/141; F02C 3/22; F02C 7/16; F02C 3/30; F02C 7/18; F02C 7/22; F01K 15/02
  See application file for complete search history.

(56) References Cited

U.S. PATENT DOCUMENTS

| | | | | |
|---|---|---|---|---|
| 5,581,996 A | * | 12/1996 | Koch | F02C 7/185 60/785 |
| 6,672,072 B1 | * | 1/2004 | Giffin, III | F01D 25/12 60/806 |
| 11,047,307 B2 | | 6/2021 | Roberge | |

(Continued)

FOREIGN PATENT DOCUMENTS

| | | | | |
|---|---|---|---|---|
| CA | 2998605 A1 | * | 3/2019 | F02C 6/08 |
| CN | 117211961 A | * | 12/2023 | |

(Continued)

OTHER PUBLICATIONS

EP Search Report for EP Patent Application No. 24182421.8 dated Nov. 7, 2024.

*Primary Examiner* — Craig Kim
(74) *Attorney, Agent, or Firm* — Getz Balich LLC (57) ABSTRACT

An engine system includes an engine core assembly, a fuel system and a cooling circuit. The engine core assembly includes a core flowpath, a compressor section, a combustor section and a turbine section. The combustor section includes a combustor adjacent a plenum. The fuel system includes a fuel flowpath, a fuel reservoir, a fuel-cooling air heat exchanger and a fuel injector. The fuel flowpath is configured to direct hydrogen fuel, received from the fuel reservoir, through the fuel-cooling air heat exchanger to the fuel injector. The fuel injector is configured to introduce the hydrogen fuel into the combustor. The cooling circuit is configured to direct cooling air, bled from the plenum, through the fuel-cooling air heat exchanger to the turbine section. The fuel-cooling air heat exchanger is configured to exchange heat energy between the hydrogen fuel flowing within the fuel flowpath and the cooling air flowing within the cooling circuit.

19 Claims, 5 Drawing Sheets

(56) References Cited

U.S. PATENT DOCUMENTS

| | | | |
|---|---|---|---|
| 11,448,132 B2 * | 9/2022 | Wiedenhoefer | F02K 3/115 |
| 11,603,798 B1 | 3/2023 | Terwilliger | |
| 11,635,022 B1 * | 4/2023 | Terwilliger | F02C 9/00 |
| | | | 60/775 |
| 2015/0337730 A1 | 11/2015 | Kupiszewski | |
| 2019/0101063 A1 * | 4/2019 | Joshi | F02C 9/52 |
| 2021/0207500 A1 * | 7/2021 | Klingels | F01K 23/10 |
| 2021/0348561 A1 | 11/2021 | Cocks | |
| 2023/0035231 A1 * | 2/2023 | Hu | B01D 5/0075 |
| 2023/0258126 A1 * | 8/2023 | Terwilliger | F02C 1/005 |
| | | | 60/39.182 |
| 2023/0280032 A1 * | 9/2023 | Clark | F02C 7/224 |
| | | | 60/730 |
| 2023/0296058 A1 * | 9/2023 | Fowler | F02C 7/264 |
| | | | 60/776 |
| 2023/0323814 A1 * | 10/2023 | Terwilliger | F02K 3/06 |
| | | | 60/806 |
| 2023/0358173 A1 * | 11/2023 | Saint-Cyr | F02C 7/224 |
| 2023/0391467 A1 * | 12/2023 | Palmer | F02C 9/40 |
| 2023/0392524 A1 * | 12/2023 | Terwilliger | F02C 3/30 |

FOREIGN PATENT DOCUMENTS

| | | | |
|---|---|---|---|
| DE | 112021007147 T5 * | 12/2023 | |
| EP | 3048281 A1 * | 7/2016 | F01D 25/32 |
| EP | 4245978 A1 * | 9/2023 | F02C 7/26 |
| EP | 4261961 A2 * | 10/2023 | B64D 27/10 |
| EP | 4279387 A1 * | 11/2023 | B64D 13/06 |
| EP | 4303417 A1 * | 1/2024 | B64D 27/026 |
| GB | 2342693 A * | 4/2000 | F01D 25/12 |
| GB | 2620439 A * | 1/2024 | B64D 27/026 |
| WO | 2022028652 A1 | 2/2022 | |
| WO | WO-2024009097 A1 * | 1/2024 | B64D 27/026 |

* cited by examiner

GAS TURBINE ENGINE WITH HYDROGEN FUEL SYSTEM

TECHNICAL FIELD

This disclosure relates generally to an aircraft and, more particularly, to a turbine engine system for the aircraft.

BACKGROUND INFORMATION

There is interest in alternative fuels for gas turbine engines. There is interest, for example, in fueling a gas turbine engine with hydrogen rather than a traditional hydrocarbon fuel such as kerosine to reduce greenhouse emissions. Various systems and methods are known in the art for fueling a gas turbine engine with hydrogen. While these known systems and methods have various advantages, there is still room in the art for improvement.

SUMMARY

According to an aspect of the present disclosure, an engine system is provided that includes an engine core assembly, a fuel system and a cooling circuit. The engine core assembly includes a core flowpath, a compressor section, a combustor section and a turbine section. The core flowpath extends through the compressor section, the combustor section and the turbine section from an inlet into the core flowpath to an exhaust from the core flowpath. The combustor section includes a plenum and a combustor adjacent the plenum. The fuel system includes a fuel flowpath, a fuel reservoir, a fuel-cooling air heat exchanger and a fuel injector. The fuel flowpath is configured to direct hydrogen fuel, received from the fuel reservoir, through the fuel-cooling air heat exchanger to the fuel injector. The fuel injector is configured to introduce the hydrogen fuel into the combustor. The cooling circuit is configured to direct cooling air, bled from the plenum, through the fuel-cooling air heat exchanger to the turbine section. The fuel-cooling air heat exchanger is configured to exchange heat energy between the hydrogen fuel flowing within the fuel flowpath and the cooling air flowing within the cooling circuit.

According to another aspect of the present disclosure, another engine system is provided that includes an engine core assembly, a fuel system and a cooling circuit. The engine core assembly includes a core flowpath, compressor section, a combustor section and a turbine section. The core flowpath extends through the compressor section, the combustor section and the turbine section from an inlet into the core flowpath to an exhaust from the core flowpath. The combustor section includes a combustor. The fuel system includes a fuel flowpath, a fuel reservoir, a fuel-core air heat exchanger, a fuel-cooling air heat exchanger and a fuel injector. The fuel flowpath is configured to direct hydrogen fuel, received from the fuel reservoir, through the fuel-core air heat exchanger and the fuel-cooling air heat exchanger to the fuel injector. The fuel injector is configured to introduce the hydrogen fuel into the combustor. The cooling circuit is configured to bleed core air from the core flowpath to provide cooling air. The fuel-core air heat exchanger is configured to exchange heat energy between the hydrogen fuel flowing within the fuel flowpath and the core air flowing within the core flowpath. The fuel-cooling air heat exchanger is configured to exchange heat energy between the hydrogen fuel flowing within the fuel flowpath and the cooling air flowing within the cooling circuit.

According to still another aspect of the present disclosure, another engine system is provided that includes an engine core assembly, a fuel system, a cooling circuit and a mechanical load. The engine core assembly includes a core flowpath, compressor section, a combustor section and a turbine section. The core flowpath extends through the compressor section, the combustor section and the turbine section from an inlet into the core flowpath to an exhaust from the core flowpath. The combustor section includes a combustor. The fuel system includes a fuel flowpath, a fuel reservoir, a fuel-cooling air heat exchanger, a turboexpander section and a fuel injector. The fuel flowpath is configured to direct hydrogen fuel, received from the fuel reservoir, through the fuel-cooling air heat exchanger and the turboexpander section to the fuel injector. The fuel injector is configured to introduce the hydrogen fuel into the combustor. The cooling circuit is configured to bleed core air from the core flowpath to provide cooling air. The fuel-cooling air heat exchanger is configured to exchange heat energy between the hydrogen fuel flowing within the fuel flowpath and the cooling air flowing within the cooling circuit. The mechanical load is operatively coupled to and mechanically powered by the turboexpander section.

The cooling circuit may be configured to bleed the core air from the core flowpath downstream of the compressor section.

The fuel system may also include a fuel-combustion products heat exchanger downstream of the combustor section along the core flowpath and downstream of the fuel-cooling air heat exchanger along the fuel flowpath. The fuel-combustion products heat exchanger may be configured to exchange heat energy between the hydrogen fuel flowing within the fuel flowpath and combustion products flowing within the core flowpath.

The turbine section may include a turbine rotor. The cooling circuit may be configured to direct the cooling air to the turbine rotor.

The turbine section may include a shroud forming a peripheral boundary of the core flowpath in the turbine section. The cooling circuit may be configured to direct the cooling air to the shroud.

The fuel reservoir may be configured to contain a quantity of the hydrogen fuel in a liquid phase. The fuel system may be configured to direct the hydrogen fuel into the combustor in a gaseous phase through the fuel injector.

The cooling circuit may be configured to bleed core air from the core flowpath within the plenum to provide the cooling air. The compressor section may include a compressor rotor. The fuel system may also include a fuel-core air heat exchanger upstream of the compressor rotor along the core flowpath. The fuel-core air heat exchanger may be configured to exchange heat energy between the hydrogen fuel flowing within the fuel flowpath and the core air flowing within the core flowpath.

The compressor rotor may include a first compressor rotor. The compressor section may also include a second compressor rotor. The fuel-core air heat exchanger may be arranged between the first compressor rotor and the second compressor rotor along the core flowpath.

The fuel system may also include a fuel-combustion products heat exchanger downstream of the combustor section along the core flowpath. The fuel-combustion products heat exchanger may be configured to exchange heat energy between the hydrogen fuel flowing within the fuel flowpath and combustion products flowing within the core flowpath.

The fuel-combustion products heat exchanger may be downstream of the turbine section along the core flowpath.

The engine assembly may also include a mechanical load with a driven rotor. The fuel system may also include a turboexpander section. The turboexpander section may include a turboexpander rotor coupled to and rotatable with the driven rotor. The fuel system may be configured to expand the hydrogen fuel flowing within the fuel flowpath along the turboexpander section to drive rotation of the turboexpander rotor. The turboexpander rotor may be configured to drive rotation driven rotor.

The turbine section may include a turbine rotor. The turbine rotor may be coupled to and configured to further drive rotation of the driven rotor.

The driven rotor may be configured as or otherwise include a propulsor rotor.

The engine system may also include a propulsor rotor. The turbine section may include a turbine rotor coupled to and rotatable with the propulsor rotor. The driven rotor may be discrete from the propulsor rotor.

The mechanical load may be configured as an electric power generator.

The fuel system may also include an accumulator. The fuel flowpath may extend through the accumulator to the fuel injector.

The engine system may also include a propulsor rotor. The turbine section may include a turbine rotor coupled to and rotatable with the propulsor rotor.

The engine system may also include an electric power generator which includes a generator rotor. The turbine section may include a turbine rotor coupled to and rotatable with the generator rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
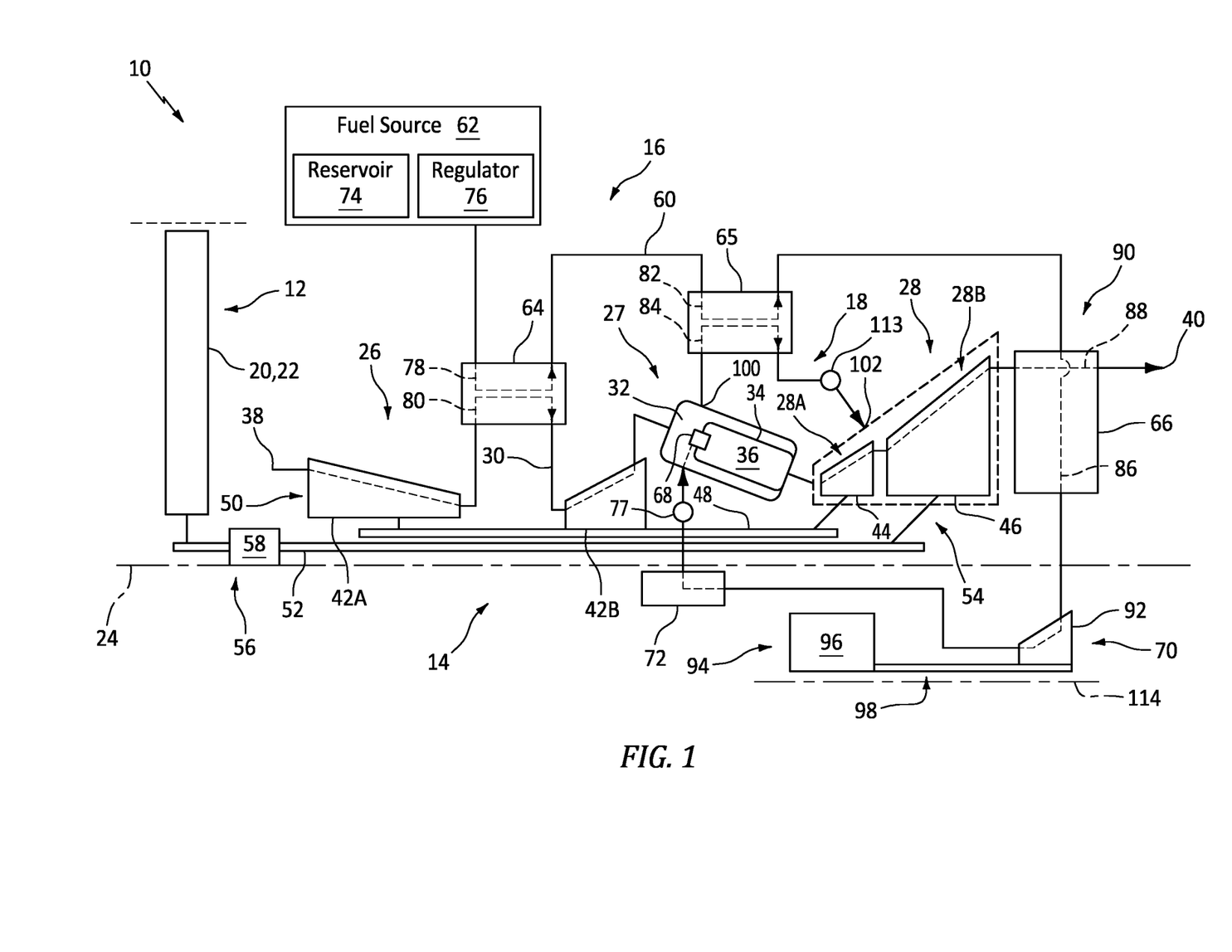
FIG. 1 is a partial schematic illustration of a gas turbine engine system for an aircraft.

FIG. 1 illustrates a gas turbine engine system 10 for an aircraft. The aircraft may be an airplane, a helicopter, a drone (e.g., an unmanned aerial vehicle (UAV)) or any other manned or unmanned aerial vehicle or system. The engine system 10 may be configured as, or otherwise included as part of, a propulsion system for the aircraft. The engine system 10 may also or alternatively be configured as, or otherwise included as part of, an electric power system for the aircraft. However, for ease of description, the engine system 10 may be generally described below as being (or part of) the aircraft propulsion system. The engine system 10 of FIG. 1 includes a mechanical load 12, an engine core assembly 14, a fuel system 16 and a cooling circuit 18.

The mechanical load 12 may be configured as or otherwise include a rotor 20 mechanically driven by the engine core assembly 14. This driven rotor 20 may be a bladed propulsor rotor 22 (e.g., an air mover) where the engine system 10 is (or is part of) the aircraft propulsion system. The propulsor rotor 22 includes a plurality of rotor blades arranged circumferentially around and connected to at least (or only) one rotor disk or hub. The propulsor rotor 22 may be an open (e.g., un-ducted) propulsor rotor or a ducted propulsor rotor. Examples of the open propulsor rotor include, but are not limited to, a propeller rotor for a turboprop propulsion system, a rotorcraft rotor (e.g., a main helicopter rotor) for a turboshaft propulsion system, a propfan rotor for a propfan propulsion system, and a pusher fan rotor for a pusher fan propulsion system. Examples of the ducted propulsor rotor include, but are not limited to, a fan rotor for a turbofan propulsion system and a (e.g., first stage) compressor rotor for a turbojet propulsion system. Alternatively, the driven rotor 20 may be a generator rotor in an electric power generator (or more generally an electric machine) where the engine system 10 is (or is part of) the electric power system; e.g., an auxiliary power unit (APU) for the aircraft. However, for ease of description, the driven rotor 20 may be generally described below as the propulsor rotor 22; e.g., the propeller rotor for the turboprop propulsion system.

The engine core assembly 14 extends axially along an axis 24 between an upstream, forward end of the engine core assembly 14 and a downstream, aft end of the engine core assembly 14. The engine core assembly 14 includes a core compressor section 26, a core combustor section 27, a core turbine section 28 and a core flowpath 30. The combustor section 27 includes a plenum 32 (e.g., a diffuser plenum) and a combustor 34 (e.g., an annular combustor). Briefly, the combustor 34 includes an internal combustion chamber 36 (e.g., an annular combustion chamber), and is disposed within or otherwise adjacent the plenum 32. The turbine section 28 of FIG. 1 includes a high pressure turbine (HPT) section 28A and a low pressure turbine (LPT) section 28B; e.g., a power turbine (PT) section. The core flowpath 30 extends sequentially through the compressor section 26, the combustor section 27 (e.g., sequentially through the plenum 32 and the combustion chamber 36), the HPT section 28A and the LPT section 28B from an airflow inlet 38 into the core flowpath 30 to a combustion products exhaust 40 from the core flowpath 30. The core inlet 38 may be disposed at (e.g., on, adjacent or proximate) the assembly forward end, and the core exhaust 40 may be disposed at the assembly aft end.

The compressor section 26 includes one or more bladed compressor rotors 42A and 42B (generally referred to as "42"). The first stage compressor rotor 42A of FIG. 1 is configured as an axial flow compressor rotor; e.g., an axial inflow-axial outflow compressor rotor. The second stage compressor rotor 42B of FIG. 1 is configured as a radial flow compressor rotor; e.g., an axial inflow-radial outflow compressor rotor. Each of these compressor rotors 42 includes a plurality of compressor blades (e.g., compressor airfoils, compressor vanes, etc.) arranged circumferentially around and connected to at least (or only) one rotor disk or hub. The compressor rotors 42 are disposed in and arranged longitudinally along the core flowpath 30 between the core inlet 38 and the combustor section 27. The compressor blades, for example, are disposed in and extend across the core flowpath 30. Each rotor disk or hub is disposed adjacent (e.g., radially below) the core flowpath 30. The present disclosure, however, is not limited to the foregoing exemplary compressor section arrangement. For example, while the compressor section 26 is schematically shown in FIG. 1 with two stages, the compressor section 26 may alternatively include a single one of the stages or more than two stages. Moreover, while the compressor rotors 42 are respectively shown as axial and radial flow compressor rotors, any one or more of the compressor rotors 42 may alternatively be configured as an axial flow compressor rotor or a radial flow compressor rotor.

The HPT section 28A includes a blade high pressure turbine (HPT) rotor 44. The HPT rotor 44 of FIG. 1 is configured as an axial flow turbine rotor; e.g., an axial inflow-axial outflow turbine rotor. The HPT rotor 44 includes a plurality of turbine blades (e.g., turbine airfoils, turbine vanes, etc.) arranged circumferentially around and connected to at least (or only) one rotor disk or hub. The HPT rotor 44 is disposed in and arranged longitudinally along the core flowpath 30 between the combustor 34 and the LPT section 28B. The turbine blades, for example, are disposed in and extend across the core flowpath 30. The rotor disk or hub is disposed adjacent (e.g., radially below) the core flowpath 30. The present disclosure, however, is not limited to the foregoing exemplary HPT section arrangement. For example, while the HPT section 28A is schematically shown in FIG. 1 with a single stage, the HPT section 28A may alternatively include multiple stages. Moreover, while the HPT rotor 44 is shown as an axial flow turbine rotor, the HPT rotor 44 may alternatively be configured as a radial flow turbine rotor.

The LPT section 28B includes a blade low pressure turbine (LPT) rotor 46. The LPT rotor 46 of FIG. 1 is configured as an axial flow turbine rotor; e.g., an axial inflow-axial outflow turbine rotor. The LPT rotor 46 includes a plurality of turbine blades (e.g., turbine airfoils, turbine vanes, etc.) arranged circumferentially around and connected to at least (or only) one rotor disk or hub. The LPT rotor 46 is disposed in and arranged longitudinally along the core flowpath 30 between the HPT section 28A and the core exhaust 40. The turbine blades, for example, are disposed in and extend across the core flowpath 30. The rotor disk or hub is disposed adjacent (e.g., radially below) the core flowpath 30. The present disclosure, however, is not limited to the foregoing exemplary LPT section arrangement. For example, while the LPT section 28B is schematically shown in FIG. 1 with a single stage, the LPT section 28B may alternatively include multiple stages. Moreover, while the LPT rotor 46 is shown as an axial flow turbine rotor, the LPT rotor 46 may alternatively be configured as a radial flow turbine rotor.

The compressor rotors 42 are coupled to and rotatable with the HPT rotor 44. The compressor rotors 42 of FIG. 1, for example, are connected to the HPT rotor 44 by a high speed shaft 48. At least (or only) the compressor rotors 42, the HPT rotor 44 and the high speed shaft 48 collectively form a high speed rotating assembly 50; e.g., a high speed spool. The LPT rotor 46 is connected to a low speed shaft 52. At least (or only) the LPT rotor 46 and the low speed shaft 52 collectively form a low speed rotating assembly 54. This low speed rotating assembly 54 is further coupled to the propulsor rotor 22 (e.g., the driven rotor 20) through a drivetrain 56. This drivetrain 56 may be configured as a geared drivetrain, where a geartrain 58 (e.g., a transmission, a speed change device, an epicyclic geartrain, etc.) is disposed between and operatively couples the propulsor rotor 22 to the low speed rotating assembly 54 and its LPT rotor 46. With this arrangement, the propulsor rotor 22 may rotate at a different (e.g., slower) rotational velocity than the low speed rotating assembly 54 and its LPT rotor 46. However, the drivetrain 56 may alternatively be configured as a direct drive drivetrain, where the geartrain 58 is omitted. With this arrangement, the propulsor rotor 22 rotates at a common (the same) rotational velocity as the low speed rotating assembly 54 and its LPT rotor 46. Referring again to FIG. 1, each of the rotating assemblies 50 and 54 and its members 42, 44 and 48, 46 and 52 may be rotatable about the axis 24. The axis 24 may thereby be a rotational axis and/or a centerline axis of the rotating assemblies 50 and 54 and their members 42, 44, 46, 48 and 52.

Figure 2:
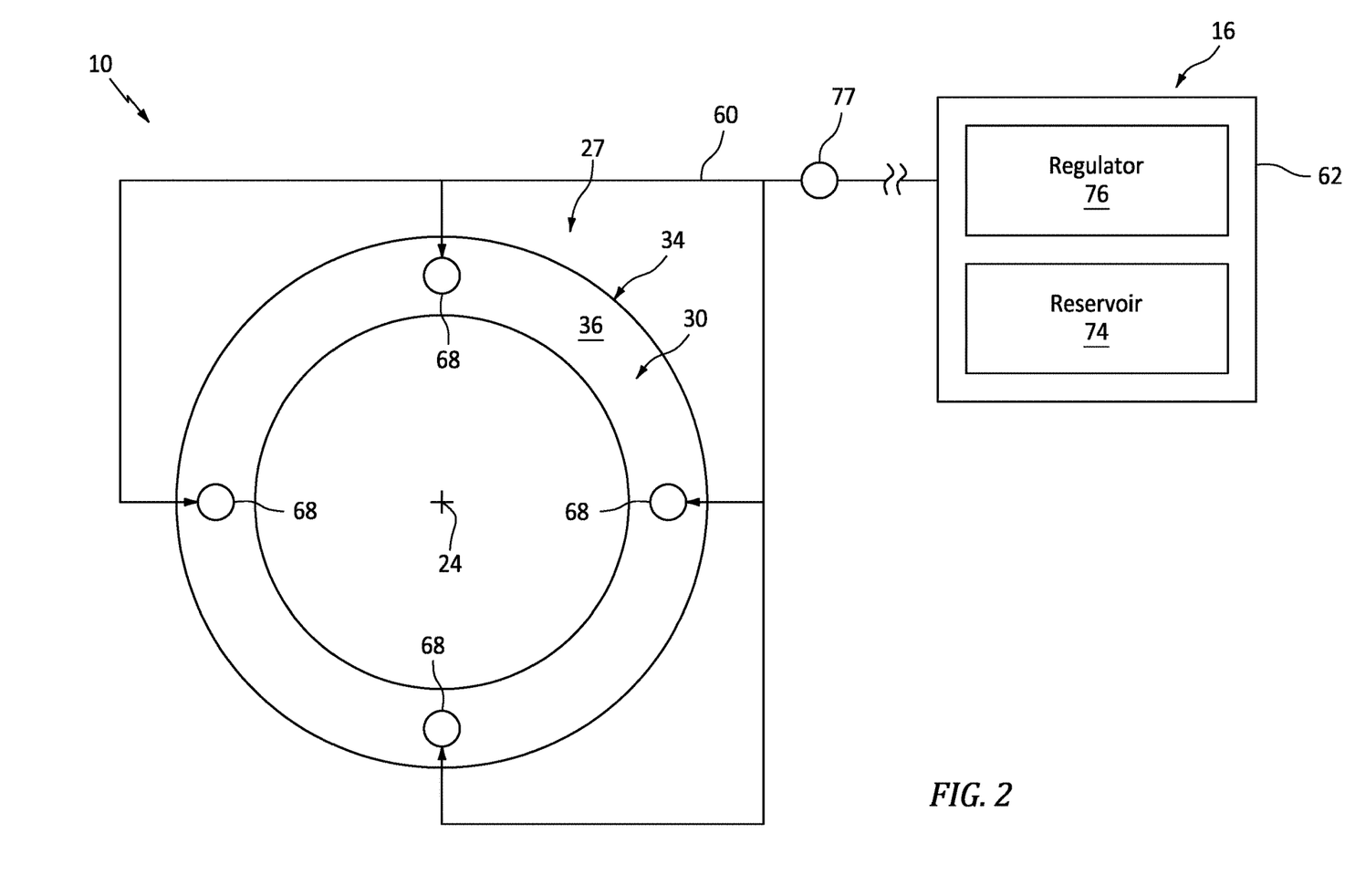
FIG. 2 is a partial schematic illustration of a fuel system arranged with a combustor section.

The fuel system 16 includes a fuel flowpath 60, a fuel source 62, one or more heat exchangers 64-66 and one or more fuel injectors 68 (see also FIG. 2). The fuel system 16 of FIG. 1 also includes a turboexpander section 70 (e.g., a fuel driven turbine section) and/or a fuel accumulator 72. The fuel flowpath 60 is fluidly coupled with an outlet from the fuel source 62 and an inlet to each fuel injector 68. This fuel flowpath 60 extends from the fuel source 62 and its outlet, sequentially through the fuel-core air heat exchanger 64 ("core air heat exchanger") (e.g., an intercooler for the core flowpath 30), the fuel-cooling air heat exchanger 65 ("cooling air heat exchanger") (e.g., a compressor bleed air cooler, a turbine cooling air cooler, etc.), the fuel-combustion products heat exchanger 66 ("combustion products heat exchanger") (e.g., a recuperator for the core flowpath 30), the turboexpander section 70 and the fuel accumulator 72, to each fuel injector 68 and its inlet.

The fuel source 62 of FIG. 1 includes a fuel reservoir 74 and a fuel flow regulator 76. The fuel reservoir 74 is configured to store a quantity of fuel (e.g., in its liquid phase) before, during and/or after engine system operation. The fuel reservoir 74, for example, may be configured as or otherwise include a tank, a cylinder, a pressure vessel, a bladder or any other type of (e.g., insulated) fuel storage container. The fuel flow regulator 76 is configured to direct a flow of the fuel from the fuel reservoir 74 to one or more or all of the fuel injectors 68 through the fuel flowpath 60. The fuel flow regulator 76, for example, may be configured as or otherwise include a fuel compressor, a fuel pump and/or a fuel valve (or valves). The fuel system 16 may also include an additional fuel flow regulator 77 downstream of the fuel accumulator 72 to direct and/or meter the flow of fuel to the engine core assembly 14.

The core air heat exchanger 64 includes an internal fuel passage 78 and an internal core air passage 80 which is fluidly discrete from the fuel passage 78. The fuel passage 78 forms a portion of the fuel flowpath 60 which extends longitudinally through the core air heat exchanger 64. The core air passage 80 forms a portion of the core flowpath 30 which extends longitudinally through the core air heat exchanger 64. This portion of the core flowpath 30 formed by the core air passage 80 of FIG. 1 is arranged between the compressor rotors 42. However, the core air heat exchanger 64 and its core air passage 80 may alternatively be arranged upstream of the compressor rotors 42 or downstream of the compressor rotors 42 in other embodiments. The core air heat exchanger 64 of FIG. 1 is schematically shown as a single pass, parallel flow heat exchanger. The core air heat exchanger 64 of the present disclosure, however, is not limited to such an exemplary arrangement. The core air heat exchanger 64, for example, may alternatively be configured as cross flow heat exchanger or a counterflow heat exchanger or some hybridization or superposition of these general configurations. Moreover, the fuel passage 78 and/or the core air passage 80 may alternatively make two or more passes within the core air heat exchanger 64.

The cooling air heat exchanger 65 includes an internal fuel passage 82 and an internal cooling air passage 84 which is fluidly discrete from the fuel passage 82. The fuel passage 82 forms a portion of the fuel flowpath 60 which extends longitudinally through the cooling air heat exchanger 65. The cooling air passage 84 forms a portion of the cooling circuit 18 which extends longitudinally through the cooling air heat exchanger 65. The cooling air heat exchanger 65 of FIG. 1 is schematically shown as a single pass, parallel flow heat exchanger. The cooling air heat exchanger 65 of the present disclosure, however, is not limited to such an exemplary arrangement. The cooling air heat exchanger 65, for example, may alternatively be configured as cross flow heat exchanger or a counterflow heat exchanger or some hybridization or superposition of these general configurations. Moreover, the fuel passage 82 and/or the cooling air passage 84 may alternatively make two or more passes within the cooling air heat exchanger 65.

The combustion products heat exchanger 66 includes an internal fuel passage 86 and an internal combustion products passage 88 which is fluidly discrete from the fuel passage 86. The fuel passage 86 forms a portion of the fuel flowpath 60 which extends longitudinally through the combustion products heat exchanger 66. The combustion products passage 88 forms a portion of the core flowpath 30 which extends longitudinally through the combustion products heat exchanger 66. This portion of the core flowpath 30 formed by the combustion products passage 88 of FIG. 1 is arranged between the LPT rotor 46 and the core exhaust 40; e.g., within an exhaust section 90 of the engine system 10. However, the combustion products heat exchanger 66 and its combustion products passage 88 may alternatively be arranged elsewhere along the core flowpath 30 downstream of the combustor section 27 in other embodiments. The combustion products heat exchanger 66 of FIG. 1 is schematically shown as a single pass, cross flow heat exchanger. The combustion products heat exchanger 66 of the present disclosure, however, is not limited to such an exemplary arrangement. The combustion products heat exchanger 66, for example, may alternatively be configured as parallel flow heat exchanger or a counterflow heat exchanger or some hybridization or superposition of these general configurations. Moreover, the fuel passage 86 and/or the combustion products passage 88 may alternatively make two or more passes within the combustion products heat exchanger 66.

The turboexpander section 70 includes a bladed turboexpander rotor 92 (e.g., a fuel driven turbine rotor). The turboexpander rotor 92 of FIG. 1 is configured as a radial flow turboexpander rotor; e.g., a radial inflow-axial outflow turboexpander rotor. The turboexpander rotor 92 includes a plurality of turbine blades (e.g., turbine airfoils, turbine vanes, etc.) arranged circumferentially around and connected to at least (or only) one rotor disk or hub. The turboexpander rotor 92 of FIG. 1 is disposed in and arranged longitudinally along the fuel flowpath 60 between (a) one or more of the fuel system members 62, 64, 65, 66 and (b) one or more of the fuel system members 68, 72. The turbine blades, for example, are disposed in and extend across the fuel flowpath 60. The rotor disk or hub is disposed adjacent (e.g., radially below) the fuel flowpath 60. The present disclosure, however, is not limited to the foregoing exemplary turboexpander section arrangement. For example, while the turboexpander section 70 is shown in FIG. 1 with a single stage, the turboexpander section 70 may alternatively include multiple stages. Moreover, while the turboexpander rotor 92 is shown as a radial flow turboexpander rotor, the turboexpander rotor 92 may alternatively be configured as an axial flow turboexpander rotor.

Figure 3:
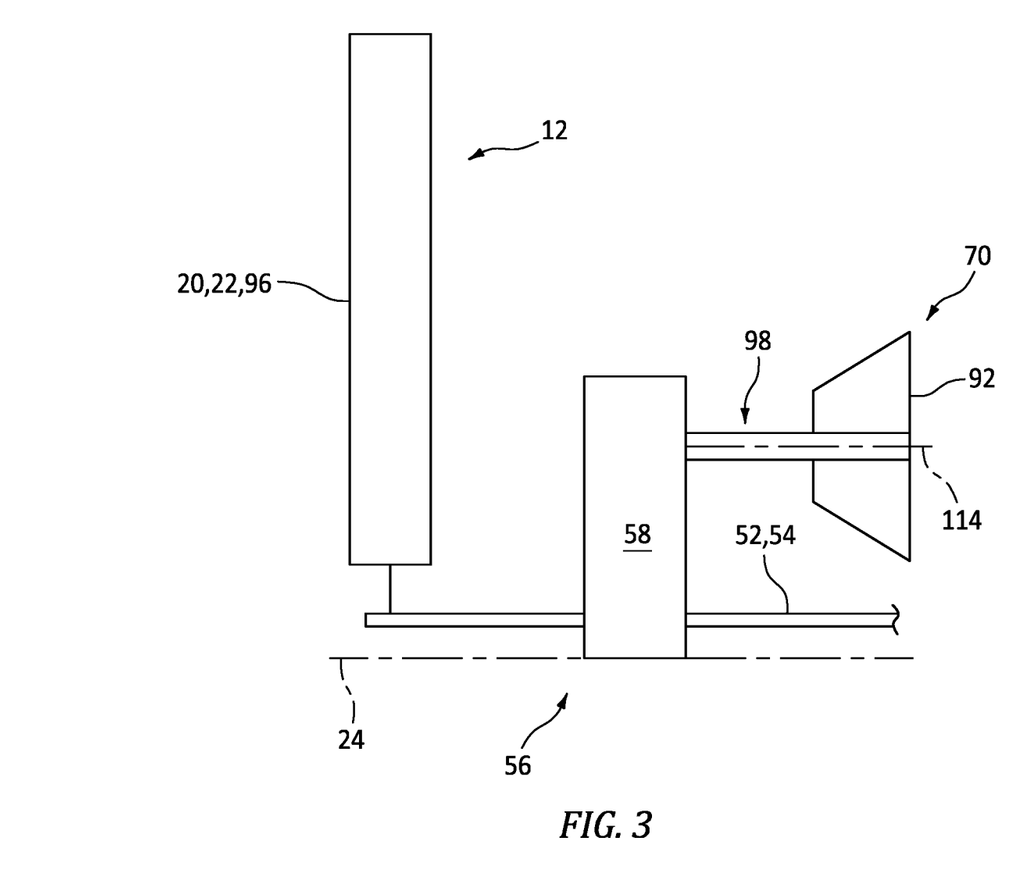
FIG. 3 is a partial schematic illustration of a turboexpander and a core rotating assembly coupled to a common mechanical load.

The turboexpander section 70 is configured to mechanically power a mechanical load 94. The turboexpander rotor 92 of FIG. 1, for example, is coupled to and rotatable with a rotor 96 of the mechanical load 94 through a drivetrain 98, which drivetrain 98 may be a geared drivetrain or a direct drive drivetrain as described above, for example. Referring to FIG. 3, the driven rotor 96 may be the same as the driven rotor 20. Both the turboexpander rotor 92 and the low speed rotating assembly 54 of FIG. 3, for example, are coupled to the propulsor rotor 22 through the geartrain 58. Thus, energy may be extracted from the fuel as described below in further detail to boost mechanical drive power to the propulsor rotor 22; e.g., the driven rotor 20. Alternatively, referring again to FIG. 1, the driven rotor 96 may be discrete from the driven rotor 20. For example, where the driven rotor 20 is the propulsor rotor 22, the driven rotor 96 may be configured as a generator rotor in an electric power generator (or more generally an electric machine). This electric power generator may supply electricity to one or more components of the engine system 10 and/or one or more other aircraft components outside of the engine system 10.

The fuel accumulator 72 of FIG. 1 is configured as, or may otherwise include, a secondary fuel reservoir. This fuel accumulator 72 is configured to (e.g., temporarily) store a quantity of the fuel (e.g., in its gaseous phase) during engine system operation. The fuel accumulator 72 may also store the fuel before and/or after engine system operation. However, the quantity of the fuel stored by the fuel accumulator 72 is (e.g., significantly) less than the quantity of the fuel stored by the fuel reservoir 74 (when full). The fuel accumulator 72 of FIG. 1, for example, is configured to provide a temporary supply of the fuel for startup of the engine system 10 and/or for balancing out (e.g., evening out) possible fluctuations of fuel flow within the fuel flowpath 60. The fuel accumulator 72 may be configured as or otherwise include a tank, a cylinder, a pressure vessel, a bladder or any other type of fuel storage container.

Referring to FIG. 2, the fuel injectors 68 may be arranged circumferentially about the axis 24 in an array; e.g., a circular array. Each fuel injector 68 is configured to direct the fuel, received from the fuel source 62 through the fuel flowpath 60 and metered by the fuel flow regulator 77, into the combustion chamber 36 for combustion. Note, while the fuel injectors 68 are schematically shown as discrete injectors, one or more of the fuel injectors 68 may alternatively be arcuate shaped, annular shaped or otherwise shaped and provided with multiple nozzle outlets; e.g., each fuel injector 68 may have a microjet configuration, a showerhead configuration or otherwise.

Figure 4:
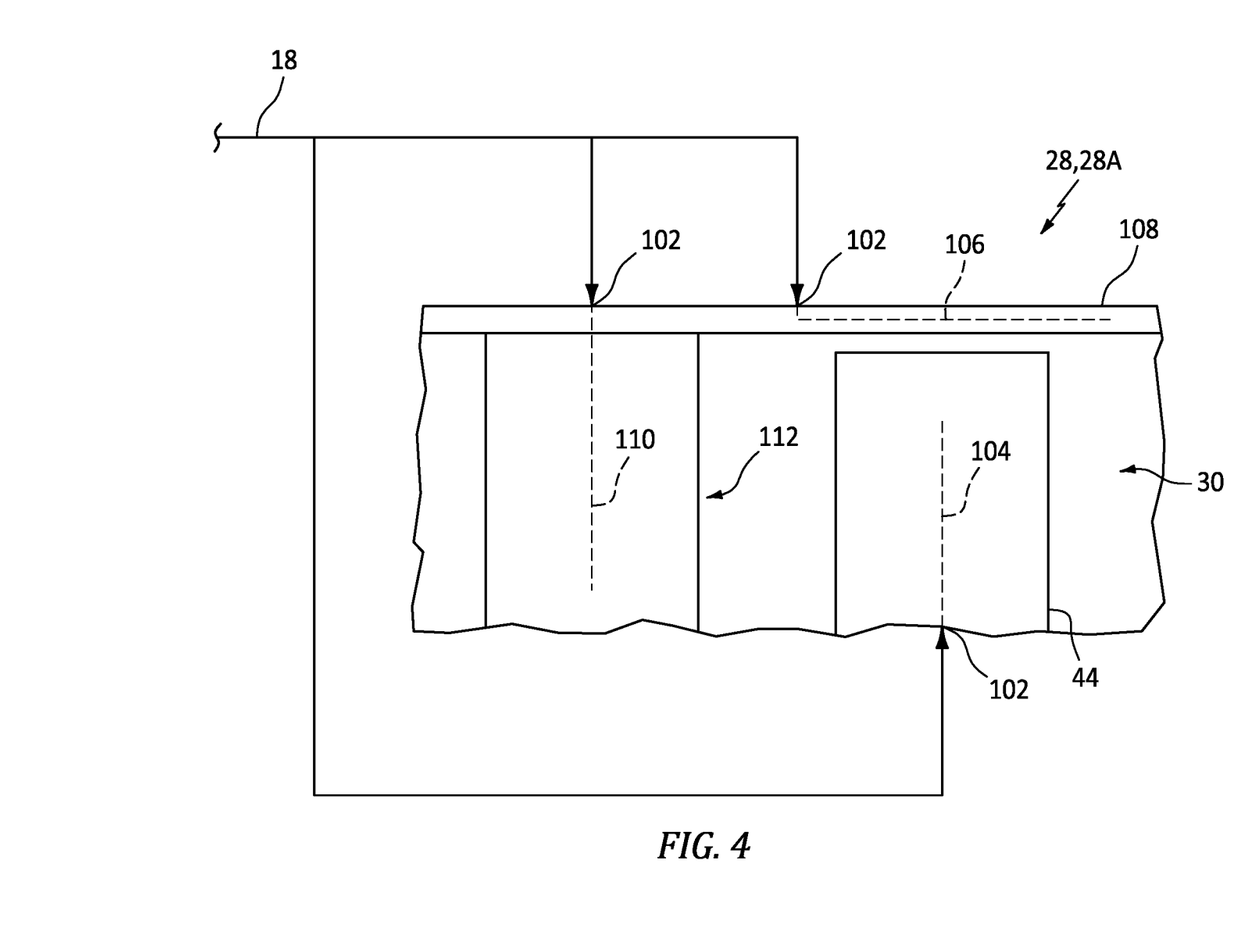
FIG. 4 is a partial schematic illustration of a cooling circuit delivering cooling air to one or more components within a turbine section.

Referring to FIG. 1, the cooling circuit 18 extends longitudinally from an inlet 100 into the cooling circuit 18, through the cooling air heat exchanger 65, to an outlet 102 from the cooling circuit 18. The circuit inlet 100 is configured to bleed core air from the core flowpath 30. This circuit inlet 100 may be located along the core flowpath 30 downstream of the compressor section 26 and upstream of the combustor 34. The circuit inlet 100 of FIG. 1, for example, is disposed along the plenum 32 and is configured to bleed some of the core air from the plenum 32 before that core air is directed into the combustion chamber 36. Each circuit outlet 102, on the other hand, is configured to deliver the bled core air—cooling air—to one or more components of the engine system 10 for cooling the system components. The circuit outlet 102 of FIG. 1, for example, is configured to deliver the cooling air to one or more components within the turbine section 28; e.g., within the HPT section 28A and/or the LPT section 28B. For example, referring to FIG. 4, the cooling circuit 18 may be configured to deliver the cooling air to an internal passage 104 (or passages) within the HPT rotor 44. The cooling circuit 18 may also or alternatively be configured to deliver the cooling air to an internal passage 106 (or passages) within (or a cooling plenum adjacent) a shroud 108; e.g., a blade outer air seal (BOAS) and/or a flowpath wall. This shroud 108 may form a peripheral boundary of at least a portion of the core flowpath 30 within the turbine section 28 (e.g., the HPT section 28A). The shroud 108 may also circumscribe the HPT rotor 44. The cooling circuit 18 may still also or alternatively be configured to deliver the cooling air to an internal passage 110 (or passages) within a stator vane array 112 (e.g., a turbine inlet vane array, a combustor exit vane array) between the combustor 34 (see FIG. 1) and the HPT rotor 44.

Referring again to FIG. 1, the fuel delivered by the fuel system 16 to the combustor section 27 and its combustor 34 may be a non-hydrocarbon fuel; e.g., a hydrocarbon free fuel. The fuel system 16, for example, may direct hydrogen ($H_2$) fuel into the combustor 34 and into its combustion chamber 36. This hydrogen fuel may be stored within the fuel source 62 and its fuel reservoir 74 in a liquid phase. The fuel reservoir 74, in other words, may contain a quantity of the hydrogen fuel as liquid hydrogen ($H_2$). The hydrogen fuel, however, may be injected or otherwise introduced into the combustion chamber 36 by the fuel injectors 68 in a gaseous phase. The fuel injectors 68, in other words, may direct the hydrogen fuel into the combustion chamber 36 as gaseous hydrogen; e.g., hydrogen ($H_2$) gas.

During engine system operation, the fuel system 16 directs a flow of the hydrogen fuel (completely or substantially in its liquid phase) into the core air heat exchanger 64. The engine core assembly 14 also directs a flow of gas-compressed core air-into the core air heat exchanger 64 as described below in further detail. Here, a temperature of the compressed core air entering the core air heat exchanger 64 is (e.g., significantly) higher than a temperature of the hydrogen fuel entering the core air heat exchanger 64. The core air heat exchanger 64 may thereby transfer heat energy from the compressed core air into the hydrogen fuel. This transfer of heat energy (heat transfer) from the compressed core air to the hydrogen fuel cools the compressed core air and heats the hydrogen fuel. The heating of the hydrogen fuel may facilitate a partial or complete phase change of the hydrogen fuel from the liquid phase to the gaseous phase.

The fuel system 16 directs the flow of the hydrogen fuel (completely or substantially in its gaseous phase) within the fuel flowpath 60 from the core air heat exchanger 64 into the cooling air heat exchanger 65. The cooling circuit 18 also directs a flow of the cooling air (e.g., core air bled from the core flowpath 30/the plenum 32) into the cooling air heat exchanger 65. Here, a temperature of the cooling air entering the cooling air heat exchanger 65 is (e.g., significantly) higher than a temperature of the hydrogen fuel entering the cooling air heat exchanger 65. The cooling air heat exchanger 65 may thereby transfer heat energy from the cooling air into the hydrogen fuel. This transfer of heat energy (heat transfer) from the cooling air to the hydrogen fuel cools the cooling air and further heats the hydrogen fuel. The heating of the hydrogen fuel may facilitate a complete phase change of the hydrogen fuel from the liquid phase to the gaseous phase. The cooling air may then be delivered (e.g., through an optional boost pressure pump 113) to the turbine section 28 (e.g., the HPT section 28A) and its component(s) 44, 108, 112 (see FIG. 4) for air cooling those component(s) 44, 108, 112.

The fuel system 16 directs the flow of the hydrogen fuel (completely in its gaseous phase) within the fuel flowpath 60 from the cooling air heat exchanger 65 into the combustion products heat exchanger 66. The engine core assembly 14 also directs a flow of gas—combustion products—into the combustion products heat exchanger 66 as described below in further detail. Here, a temperature of the combustion products entering the combustion products heat exchanger 66 is (e.g., significantly) higher than a temperature of the hydrogen fuel entering the combustion products heat exchanger 66. The combustion products heat exchanger 66 may thereby transfer heat energy from the combustion products into the hydrogen fuel. This transfer of heat energy (heat transfer) from the combustion products to the hydrogen fuel cools the combustion products and still further heats the hydrogen fuel. Moreover, the transfer of heat energy recuperates energy from the combustion products which may be utilized for powering the turboexpander section 70 and/or preparing the hydrogen fuel for combustion as described below.

The fuel system 16 directs the heated hydrogen fuel (in its gaseous phase) within the fuel flowpath 60 from the combustion products heat exchanger 66 to the turboexpander section 70 for expansion across the turboexpander rotor 92. Within the turboexpander section 70, the expansion of the hydrogen fuel may drive rotation of the turboexpander rotor 92 about its rotational axis 114. The rotation of the turboexpander rotor 92 may drive rotation of the driven rotor 96; e.g., the propulsor rotor 22 or a generator rotor. The fuel system 16 subsequently directs the expanded hydrogen fuel within the fuel flowpath 60 from the turboexpander section 70, through the fuel accumulator 72, to the fuel injectors 68 for injection into the combustion chamber 36.

Concurrently during the engine system operation, air is directed across the propulsor rotor 22 and into the core flowpath 30. The air entering the core flowpath 30 may be referred to as the core air. This core air is compressed by the first stage compressor rotor 42A and directed into the core air heat exchanger 64. The core air heat exchanger 64 may cool the compressed core air as described above. This cooled compressed core air may be further compressed by the second stage compressor rotor 42B before being diffused within the plenum 32 and directed into the combustor 34 and its combustion chamber 36. The hydrogen fuel supplied by the fuel injectors 68 and the compressed core air are mixed within the combustion chamber 36 to provide a fuel-air mixture. This fuel-air mixture is ignited and combustion products thereof flow through and sequentially cause the HPT rotor 44 and the LPT rotor 46 to rotate. The combustion products may then be directed through the combustion products heat exchanger 66 and exhausted from the engine system 10 through the core exhaust 40. The rotation of the HPT rotor 44 drives rotation of the compressor rotors 42 and, thus, compression of the air directed into the core flowpath 30 through the core inlet 38. The rotation of the LPT rotor 46 drives rotation of the propulsor rotor 22. The rotation of the propulsor rotor 22 may propel additional air (e.g., outside air, bypass air, etc.) outside of and axially along the engine core assembly 14 to provide aircraft thrust. The propulsion of this additional air may account for a majority of the aircraft thrust generated by the engine system 10. Of course, where the driven rotor 20 is alternatively configured as the generator rotor, the rotation of the generator rotor may facilitate generation of electric power.

The engine system 10 and its fuel system 16 are described above with multiple heat exchangers 64-66. It is contemplated, however, any one or more of the heat exchangers (e.g., the core air heat exchanger 64 and/or the combustion products heat exchanger 66) may be omitted depending on engine system parameters and/or requirements. Where the core air heat exchanger 64 is omitted, the cooling air heat exchanger 65 may be operable to facilitate the partial or complete phase change of the hydrogen fuel from the liquid phase to the gaseous phase. It is also contemplated the order of the heat exchangers along the fuel flowpath 60 may be varied; e.g., the cooling air heat exchanger 65 may be arranged upstream of the core air heat exchanger 64 along the fuel flowpath 60. The present disclosure therefore is not limited to the exemplary fuel system arrangement of FIG. 1.

In some embodiments, the engine system 10 may be configured for a dry cycle. The engine system 10 of FIG. 1, for example, is configured for operation without the use of water or steam. By contrast, an engine system with a wet cycle may utilize water and/or steam to cool one or more engine components. The water and/or the steam may also or alternatively be injected into a core flowpath of the engine system (e.g., into a combustion chamber) to modify parameters of a combustion process, among other things. The present disclosure, however, is not limited to such an exemplary dry cycle.

Figure 5:
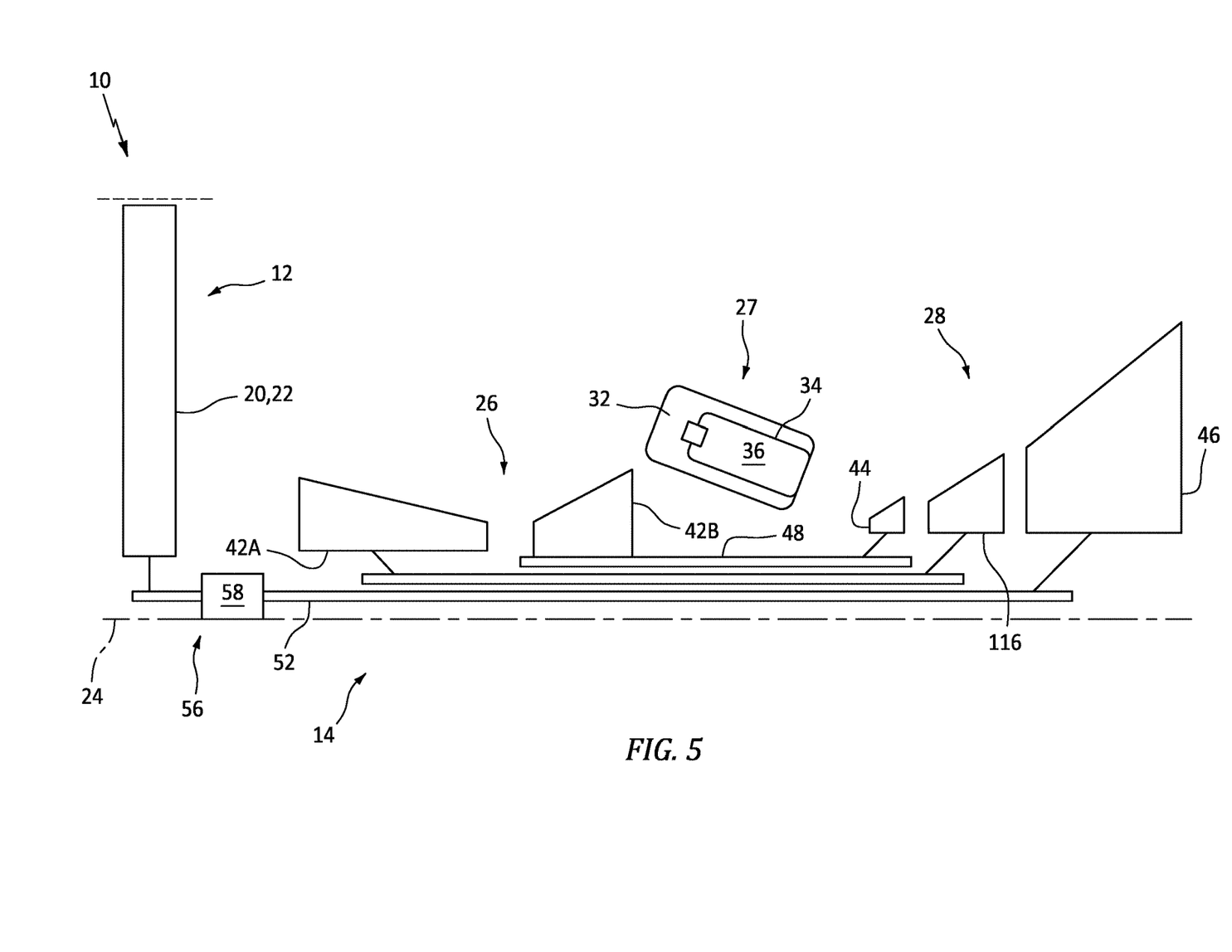
FIG. 5 is a partial schematic illustration of the gas turbine engine with three rotating assemblies.

The engine core assembly 14 is shown in FIG. 1 with two rotating assemblies 50 and 54. It is contemplated, however, the engine core assembly 14 may alternatively be configured with a single rotating assembly, or with three or more rotating assemblies. The engine core assembly 14 of FIG. 5, for example, is configured with an additional turbine rotor 116 (e.g., an intermediate pressure turbine (IPT) rotor) coupled to and configured to drive rotation of the compressor rotor 42A.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An engine system, comprising:
   an engine core assembly including a core flowpath, a compressor section, a combustor section and a turbine section, the core flowpath extending through the compressor section, the combustor section and the turbine section from an inlet into the core flowpath to an exhaust from the core flowpath, the compressor section comprising a compressor rotor, and the combustor section comprising a plenum and a combustor adjacent the plenum;
   a fuel system including a fuel flowpath, a fuel reservoir, a fuel-cooling air heat exchanger and a fuel injector, the fuel flowpath configured to direct hydrogen fuel, received from the fuel reservoir, through the fuel-cooling air heat exchanger to the fuel injector, and the fuel injector configured to introduce the hydrogen fuel into the combustor; and
   a cooling circuit configured to direct cooling air, bled from the plenum, through the fuel-cooling air heat exchanger to the turbine section, the cooling circuit configured to bleed core air from the core flowpath within the plenum to provide the cooling air;
   the fuel-cooling air heat exchanger configured to exchange heat energy between the hydrogen fuel flowing within the fuel flowpath and the cooling air flowing within the cooling circuit; and
   the fuel system further including a fuel-core air heat exchanger upstream of the compressor rotor along the core flowpath, and the fuel-core air heat exchanger configured to exchange heat energy between the hydrogen fuel flowing within the fuel flowpath and the core air flowing within the core flowpath.

2. The engine system of claim 1, wherein
   the turbine section comprises a turbine rotor; and
   the cooling circuit is configured to direct the cooling air to the turbine rotor.

3. The engine system of claim 1, wherein
   the turbine section comprises a shroud forming a peripheral boundary of the core flowpath in the turbine section; and
   the cooling circuit is configured to direct the cooling air to the shroud.

4. The engine system of claim 1, wherein
   the fuel reservoir is configured to contain a quantity of the hydrogen fuel in a liquid phase; and
   the fuel system is configured to direct the hydrogen fuel into the combustor in a gaseous phase through the fuel injector.

5. The engine system of claim 1, wherein
   the compressor rotor comprises a first compressor rotor, and the compressor section further comprises a second compressor rotor; and
   the fuel-core air heat exchanger is arranged between the first compressor rotor and the second compressor rotor along the core flowpath.

6. The engine system of claim 1, wherein
   the fuel system further includes a fuel-combustion products heat exchanger downstream of the combustor section along the core flowpath; and
   the fuel-combustion products heat exchanger is configured to exchange heat energy between the hydrogen fuel flowing within the fuel flowpath and combustion products flowing within the core flowpath.

7. The engine system of claim 6, wherein the fuel-combustion products heat exchanger is downstream of the turbine section along the core flowpath.

8. The engine system of claim 1, further comprising:
   a mechanical load with a driven rotor;
   the fuel system further including a turboexpander section, and the turboexpander section comprising a turboexpander rotor coupled to and rotatable with the driven rotor;
   the fuel system configured to expand the hydrogen fuel flowing within the fuel flowpath along the turboexpander section to drive rotation of the turboexpander rotor; and
   the turboexpander rotor configured to drive rotation driven rotor.

9. The engine system of claim 8, wherein
   the turbine section comprises a turbine rotor; and
   the turbine rotor is coupled to and configured to further drive rotation of the driven rotor.

10. The engine system of claim 9, wherein the driven rotor comprises a propulsor rotor.

11. The engine system of claim 8, further comprising:
    a propulsor rotor;

the turbine section comprising a turbine rotor coupled to and rotatable with the propulsor rotor; and the driven rotor is discrete from the propulsor rotor.

12. The engine system of claim 11, wherein the mechanical load is configured as an electric power generator.

13. The engine system of claim 1, wherein the fuel system further comprises an accumulator; and the fuel flowpath extends through the accumulator to the fuel injector.

14. The engine system of claim 1, further comprising:

a propulsor rotor;

the turbine section comprising a turbine rotor coupled to and rotatable with the propulsor rotor.

15. The engine system of claim 1, further comprising:

an electric power generator comprising a generator rotor;

the turbine section comprising a turbine rotor coupled to and rotatable with the generator rotor.

16. An engine system, comprising:

an engine core assembly including a core flowpath, a compressor section, a combustor section and a turbine section, the core flowpath extending through the compressor section, the combustor section and the turbine section from an inlet into the core flowpath to an exhaust from the core flowpath, and the combustor section comprising a combustor;

a fuel system including a fuel flowpath, a fuel reservoir, a fuel-core air heat exchanger, a fuel-cooling air heat exchanger and a fuel injector, the fuel flowpath configured to direct hydrogen fuel, received from the fuel reservoir, through the fuel-core air heat exchanger and the fuel-cooling air heat exchanger to the fuel injector, and the fuel injector configured to introduce the hydrogen fuel into the combustor; and a cooling circuit configured to bleed core air from the core flowpath to provide cooling air;

the fuel-core air heat exchanger configured to exchange heat energy between the hydrogen fuel flowing within the fuel flowpath and the core air flowing within the core flowpath; and the fuel-cooling air heat exchanger configured to exchange heat energy between the hydrogen fuel flowing within the fuel flowpath and the cooling air flowing within the cooling circuit;

wherein the compressor section comprises a compressor rotor, and the fuel-core air heat exchanger is upstream of the compressor rotor along the core flowpath.

17. The engine system of claim 16, wherein the cooling circuit is configured to bleed the core air from the core flowpath downstream of the compressor section.

18. The engine system of claim 16, wherein the fuel system further includes a fuel-combustion products heat exchanger downstream of the combustor section along the core flowpath and downstream of the fuel-cooling air heat exchanger along the fuel flowpath; and the fuel-combustion products heat exchanger is configured to exchange heat energy between the hydrogen fuel flowing within the fuel flowpath and combustion products flowing within the core flowpath.

19. The engine system of claim 16, wherein the cooling circuit is configured to bleed the core air from the core flowpath within a plenum to provide the cooling air, and the combustor is adjacent the plenum.

* * * * *